United States Patent
Takemori

(10) Patent No.: US 9,195,553 B2
(45) Date of Patent: Nov. 24, 2015

(54) REDUNDANT SYSTEM CONTROL METHOD

(71) Applicant: Yasushi Takemori, Tokyo (JP)

(72) Inventor: Yasushi Takemori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 13/828,751

(22) Filed: Mar. 14, 2013

(65) Prior Publication Data

US 2013/0262917 A1 Oct. 3, 2013

(30) Foreign Application Priority Data

Mar. 29, 2012 (JP) .................................. 2012-076294

(51) Int. Cl.
*G06F 11/00* (2006.01)
*G06F 11/20* (2006.01)
*G06F 11/16* (2006.01)

(52) U.S. Cl.
CPC ........ *G06F 11/2028* (2013.01); *G06F 11/1658* (2013.01); *G06F 11/2023* (2013.01); *G06F 11/1629* (2013.01); *G06F 11/2038* (2013.01)

(58) Field of Classification Search
CPC . G06F 11/2028; G06F 11/14; G06F 11/1402; G06F 11/16; G06F 11/1608; G06F 11/1629; G06F 11/1658; G06F 11/1675; G06F 11/202; G06F 11/2023; G06F 11/2038

USPC .............. 714/12, 4.11, 4.2, 4.21, 10, 11, 47.1
See application file for complete search history.

(56) References Cited

U.S. PATENT DOCUMENTS

| | | | |
|---|---|---|---|
| 6,279,119 B1 * | 8/2001 | Bissett et al. | 714/12 |
| 8,117,495 B2 * | 2/2012 | Graham et al. | 714/11 |
| 8,635,492 B2 * | 1/2014 | Gara et al. | 714/11 |
| 2002/0152418 A1 * | 10/2002 | Griffin et al. | 714/11 |

FOREIGN PATENT DOCUMENTS

JP 11134210 A 5/1999

* cited by examiner

*Primary Examiner* — Joseph D Manoskey

(57) ABSTRACT

The redundant system includes a redundant server of a first system and a redundant server of a second system. The redundant servers of the first system and the second system operate in lockstep. When a failure occurs in the redundant server of the second system, the redundant server of the first system separates the redundant server of the second system in which the failure has occurred and continues the operation, and then prepares for restoration to a duplexed operation with a configuration in which the failed part is fallen back. When the preparation is completed, both redundant servers of the first system and the second system start a lockstep operation from initialization processing by synchronous reset, and resume the duplexed operation with the configuration in which the failed part is fallen back.

12 Claims, 2 Drawing Sheets

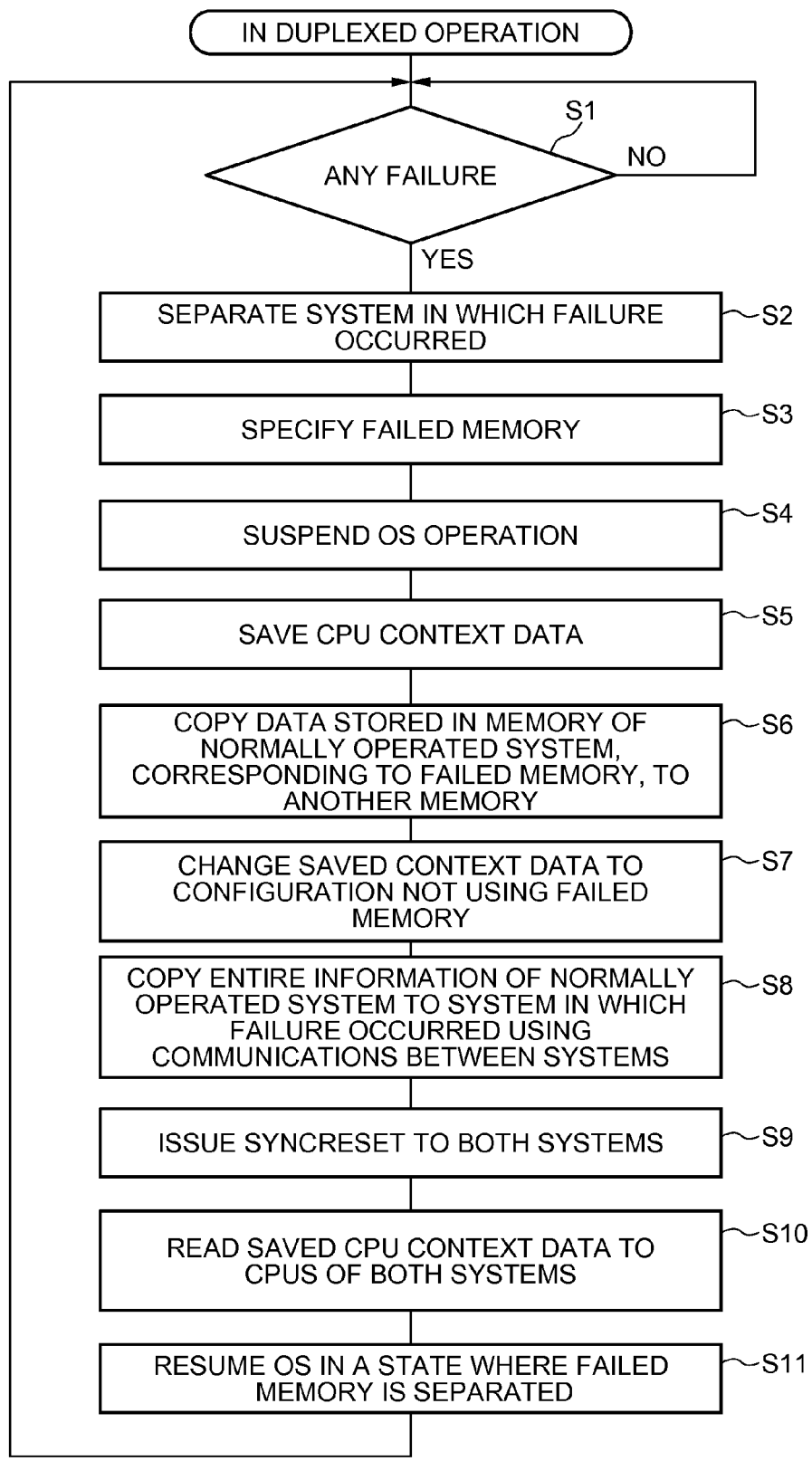

REDUNDANT SYSTEM CONTROL METHOD

INCORPORATION BY REFERENCE

This application is based upon and claims the benefit of priority from Japanese patent application No. 2012-076204, filed on Mar. 29, 2012, the disclosure of which is incorporated herein in its entirety by reference.

TECHNICAL FIELD

The present invention relates to a redundant system, a redundant system control method, and a redundant server.

BACKGROUND ART

As one of redundant systems providing high reliability, a fault tolerant (FT) system has been known.

A fault tolerant system is a computer system in which fault tolerance is improved by duplexing or multiplexing (hereinafter simply referred to as duplexing) hardware modules constituting the system, operating all of the duplexed modules in synchronization, and even if a fault occurs in any part, separating the failed module and continuing processing using the normal modules.

The basic configuration of a fault tolerant system is constituted of hardware modules including a CPU (Central Processing Unit), a memory, an I/O device, and the like which are to be duplexed, and a fault tolerant control section (hereinafter referred to as an FT control section) which is connected with the modules and performs synchronous operation processing, switching control when a fault occurs, and the like. In general, a fault tolerance system is divided into a part in which respective modules are duplexed using hardware and a part in which they are duplexed using software. For example, a CPU subsystem including a CPU and a memory is an infrastructure on which software operates, so it is necessary to be duplexed by hardware. As such, the duplexed CPU subsystems must operate with the same clock. In this way, operating duplexed CPU subsystems in synchronous with each other completely in clock units is called a lockstep operation. As such, if an error occurs in a CPU subsystem, the hardware (FT control section) separates the CPU and the memory of the CPU subsystem from the system so as to control the system such that the error does not affect the CPU and the memory operating normally.

On the other hand, in the case of a fault of an I/O device, it is possible to switch the I/O device by software if the FT control section detecting it notifies the software controlling the I/O device (hereinafter referred to as an I/O device driver) of an error. In that case, the I/O device driver stops using the failed I/O device, and uses another I/O device which is the duplexed one, instead of the failed one.

As described above, in a fault tolerant system, when a failure occurs generally, the system of the failed side is separated, and the operation is continued only using the remaining normal system. However, if the system of one side is separated, there is a problem that redundancy is lost, so that the system will stop if another failure occurs.

As related art of the present invention, Patent Document 1 (JP 11-134210 A) discloses a system redundancy method. In the related art, each module is made redundant by being, at least, duplexed, and respective functions in a module are divided into blocks, or respective functional elements are provided in a multiple number of pieces. If a failure occurs in a part of any function in a module, the block in which the failure has occurred or the failed functional element is separated so as to implement a degraded operation. Further, a normal redundant module, which operates in parallel, is also caused to implement a degraded operation in parallel so as to have the same configuration as that of the module performing a degraded operation due to the failure.

Patent Document 1: JP 11-134210 A

However, it is difficult to apply the above-described related art to a redundant system which implements a lockstep operation because of the following grounds. In the related art, the failed system and the normal system perform different operations while respective redundant modules run in parallel. This means that a system including a memory, which is separated because it is failed actually, and a system including a memory, which is separated because it corresponds to the failed memory and it is separated in order to realize the same configuration as that of the failed system, run in parallel but perform different operations. However, in a redundant system which implements a lockstep operation, during a parallel operation in a lockstep mode, all systems perform the same operation, so that it is unlikely that the two systems perform different operations.

SUMMARY

An exemplary object of the present invention is to provide a redundant system control method capable of solving the above-described problem, that is, a problem that in a redundant system which implements a lockstep operation, it is difficult to restore the system to a duplexed operation by only falling back a failed part.

A redundant system control method according to a first aspect of the present invention is a control method for a redundant system including a redundant server of a first system and a redundant server of a second system, the redundant server of the first system and the redundant server of the second system operating in lockstep.

The method includes, when a failure occurs in the redundant server of the second system, by the redundant server of the first system, separating the redundant server of the second system in which the failure has occurred and continuing an operation;

by the redundant server of the first system, preparing for restoration to a duplexed operation with a configuration in which a failed part is fallen back; and by both the redundant server of the first system and the redundant server of the second system, starting a lockstep operation from initialization processing by synchronous reset, and resuming the duplexed operation with the configuration in which the failed part is fallen back.

Further, a redundant system, according to a second aspect of the present invention, includes a redundant server of a first system and a redundant server of a second system.

The redundant server of the first system and the redundant server of the second system operate in lockstep.

When a failure occurs in the redundant server of the second system, after the redundant server of the first system separates the redundant server of the second system in which the failure has occurred and continues the operation, the redundant server of the first system prepares for restoration to a duplexed operation with a configuration in which a failed part is fallen back, and both the redundant server of the first system and the redundant server of the second system start a lockstep operation from initialization processing by synchronous reset when the preparation is completed, and resume the duplexed operation with the configuration in which the failed part is fallen back.

Further, a redundant server, according to a third aspect of the present invention, is a redundant server of a first system in a redundant system, the redundant system including the redundant server of the first system and a redundant server of a second system.

The redundant server of the first system includes a first fault tolerant control section.

In a state where the redundant server of the first system and the redundant server of the second system operate in lockstep, when a failure occurs in the redundant server of the second system, the first fault tolerant control section performs control to separate the redundant server of the second system in which the failure has occurred and continue the operation, control to prepare for restoration to a duplexed operation with a configuration in which a failed part is fallen back, and control to start a lockstep operation from initialization processing by synchronous reset with the redundant server of the second system and resume the duplexed operation with the configuration in which the failed part is fallen back.

As the present invention has the above-described configuration, in a redundant system which operates in lockstep, it is possible to restore the system to a duplexed operation by only falling back a failed part.

BRIEF DESCRIPTION OF DRAWINGS

FIG. 2 is a flowchart showing an operation of the fault tolerant system, when a failure occurs, according to the exemplary embodiment of the present invention.

EXEMPLARY EMBODIMENTS

Figure 1:
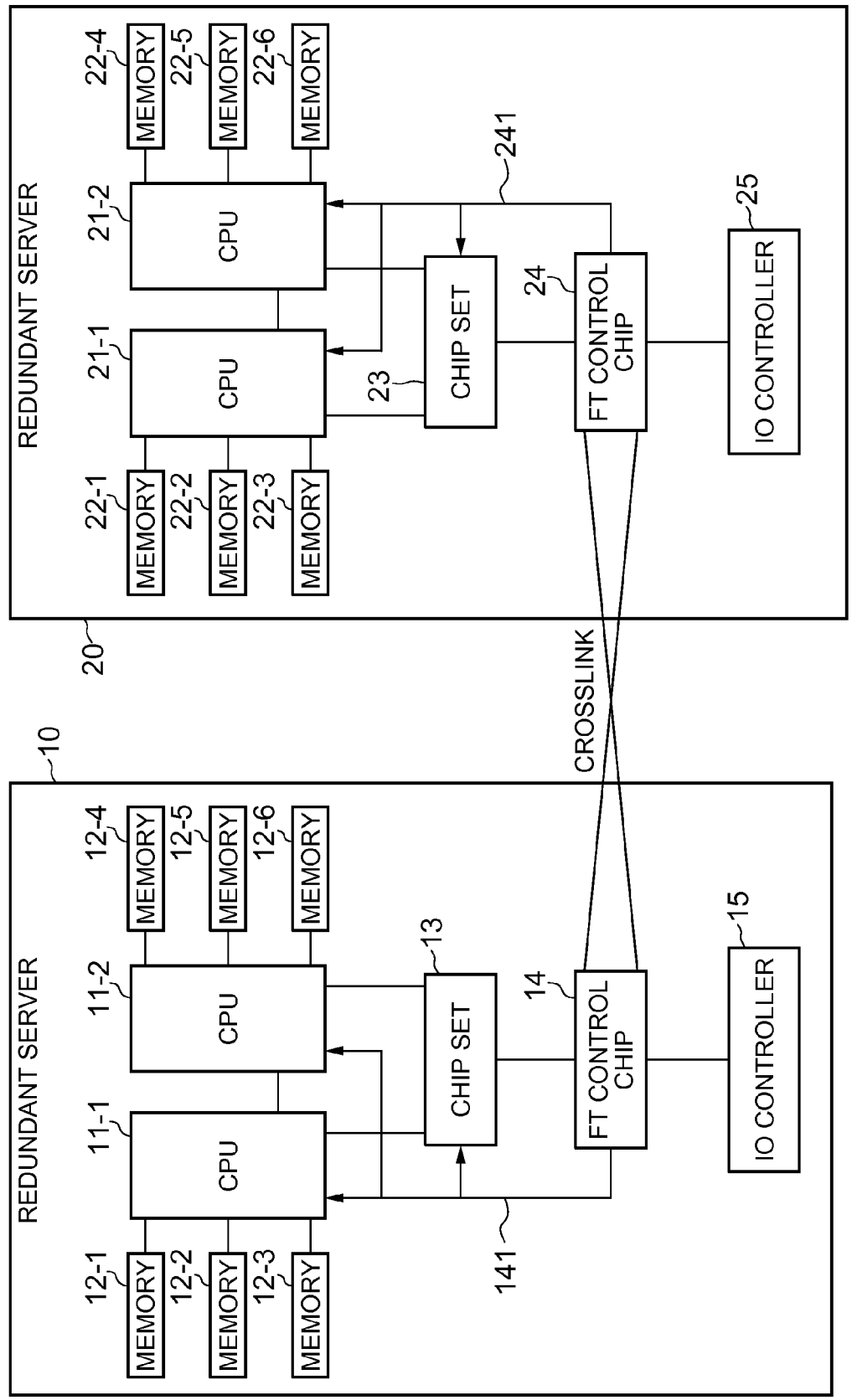
FIG. 1 is a block diagram showing an exemplary configuration of a fault tolerant system according to an exemplary embodiment of the present invention.

The present invention is intended for redundant systems. Here, a fault tolerant system, which is one of redundant systems, is described as an example. However, the present invention is not limited to a fault tolerant system in practice. For example, the present invention is applicable to a cluster system or other redundant systems.

Embodiment

Hereinafter, an exemplary embodiment of the present invention will be described with reference to the accompanying drawings.

[System Configuration]

Reference to FIG. 1, an exemplary configuration of a fault tolerant system according to an exemplary embodiment of the present invention will be described.

A fault tolerant system according to the present embodiment includes a redundant server 10 and a redundant server 20.

In this example, the redundant server 10 is a computer system of a first system (system A), and the redundant server 20 is a computer system of a second system (system B).

It is preferable that the redundant server 10 of the first system and the redundant server 20 of the second system have completely the same configuration. At least redundant constitutional elements have completely the same configuration.

The redundant server 10 of the first system and the redundant server 20 of the second system operate in lockstep, and when a failure occurs, the system in which the failure has occurred is separated once to continue the operation generally (basically), and according to a selection of user policy, the system returns to a duplexed operation with a configuration in which the failed part is fallen back.

The expression "according to a selection of user policy" mentioned above means that a user is able to select either "policy 1" or "policy 2" shown below.

"Policy 1" When a failure occurs, separation is performed by each module although redundancy is lost, and the operation is continued without performing a fall-back operation, which is the same as a conventional fault tolerant system.

"Policy 2" By focusing on redundancy, only the failed part is fallen back, and the system returns to a duplexed operation.

In this example, when a failure occurs, the system in which the failure has occurred is generally separated once and the operation is continued according to "policy 1". Then, if the user selects "policy 2", only the failed part is fallen back and the system returns to a duplexed operation. On the contrary, it is also possible to fall back only the failed part in general and return to a duplexed operation according to "policy 2", and if the user selects "policy 1", separate the system in which the failure has occurred and continue the operation, of course.

[Configuration of Redundant Server]

Next, exemplary configurations of the redundant server 10 of the first system and the redundant server 20 of the second system will be described.

The redundant server 10 of the first system includes CPUs 11 (11-$a$, a=1~x: x is arbitrary), memories 12 (12-$b$, b=1~y: y is arbitrary), a chip set 13, an FT (Fault Tolerant) control chip 14, and an IO (Input/Output) controller 15.

Similarly, the redundant server 20 of the second system includes CPUs 21 (21-$a$, a=1~x: x is arbitrary), memories 22 (22-$b$, b=1~y: y is arbitrary), a chip set 23, an FT control chip 24, and an IO controller 25.

Each of the CPUs 11 (11-$a$, a=1~x) is connected with any of the memories 12 (12-$b$, b 1~y). Similarly, each of the CPUs 21 (21-$a$, a=1~x) is connected with any of the memories 22 (22-$b$, b=1~y).

The chip set 13 is connected with the CPUs 11 (11-$a$, a=1~x). Similarly, the chip set 23 is connected with the CPUs 21 (21-$a$, a=1~x).

The FT control chip 14 is connected with the chip set 13 and the CPUs 11 (11-$a$, a=1~x). The FT control chip 14 transmits a signal 141 to the chip set 13 and the CPUs 11 (11-$a$, a=1~x). Similarly, the FT control chip 24 is connected with the chip set 23 and the CPUs 21 (21-$a$, a=1~x). The FT control chip 24 transmits a signal 241 to the chip set 23 and the CPUs 21 (21-$a$, a=1~x). In this example, the FT control chip 14 and the FT control chip 24 are connected with each other via a crosslink, and perform data transfer between the redundant server 10 of the first system and the redundant server 20 of the second system. It should be noted that a crosslink is a communication path for mutual connection.

The IO controller 15 is connected with the FT control chip 14. Similarly, the IO controller 25 is connected with the FT control chip 24. The IO controller 15 and the IO controller 25 are able to be connected with external devices such as input/output devices and auxiliary storage units (disks, etc.).

Although not shown, in this example, a main unit BIOS (Basic Input/Output System), which is firmware for the main unit, is stored in a flash memory connected with the FT control chip 14 and a flash memory connected with the FT control chip 24. Further, software (SW) for the main unit is stored in an auxiliary storage unit connected with the IO controller 15 and an auxiliary storage unit connected with the IO controller 25. The FT control chip 14 and the FT control chip 24 are able to use those main unit BIOS and software.

Next, synchronous reset, to be used in the operation when a failure occurs which will be described below, will be described in advance.

[Operation of Synchronous Reset]

First, an operation of synchronous reset (SyncReset) will be described.

The FT control chip 14 in the redundant server 10 of the first system and the FT control chip 24 in the redundant server 20 of the second system issue SyncReset commands of the main unit BIOS. It should be noted that the FT control chip 14 and the FT control chip 24 may, if one of the FT control chip 14 and the FT control chip 24 issues a SyncReset command of the main unit BIOS, notifies/transfers the SyncReset command to the other via the crosslink.

Next, in the redundant server 10 of the first system, the FT control chip 14 shifts the mode of each of the memories 12 (12-$b$, b=1~y) to a self-refresh mode via the chip set 13 and the CPUs 11 (11-$a$, a=1~x). Similarly, in the fault tolerant server 20 of the second system, the FT control chip 24 shifts the mode of each of the memories 12 (12-$b$, b=1~y) to a self-refresh mode via the chip set 23 and the CPUs 21 (21-$a$, a=1~x).

Next, in the redundant server 10 of the first system, the FT control chip 14 transmits a SyncReset signal as the signal 141 to the chip set 13 and the CPUs 11 (11-$a$, a=1~x) to assert SyncReset. As such, with respect to the chip set 13 and the CPUs 11 (11-$a$, a=1~x), SyncReset becomes active (valid/logically authentic). Similarly, in the redundant server 20 of the second system, the FT control chip 24 transmits a SyncReset signal as the signal 241 to the chip set 23 and the CPUs 21 (21-$a$, a=1~x) to assert SyncReset. It should be noted that the FT control chip 14 and the FT control chip 24 may be adapted such that if one of the FT control chip 14 and the FT control chip 24 transmits a SyncReset signal, the chip notifies/transfers the SyncReset signal to the other via the crosslink.

[Synchronous Processing Via Crosslink]

The FT control chip 14 in the redundant server 10 of the first system and the FT control chip 24 in the redundant server 20 of the second system are in synchronous with each other via the crosslink. As such, the FT control chip 14 and the FT control chip 24 perform the SyncReset operation simultaneously.

[Lockstep Operation of CPU Initialization Processing]

Further, as the CPU 11 in the redundant server 10 of the first system and the CPU 21 in the redundant server 20 of the second system perform a lockstep operation for every processing, they also perform initialization processing by the SyncReset in lockstep.

[Maintenance of Data in Memories by Self-Refresh Operation]

Further, in a reset processing period, the CPU 11 in the redundant server 10 of the first system and the CPU 21 in the redundant server 20 of the second system maintain the data stored in each of the memories 12 (12-$b$, b=1~y) and the memories 22 (22-$b$, b=1~y) by self-refresh operation without resetting the data.

[SyncReset Release Operation]

Similar to the SyncReset operation, an operation of releasing SyncReset is also performed simultaneously.

Hereinafter, an operation to release SyncReset will be described. The operation to release SyncReset is basically performed in the same procedure as that of the SyncReset operation.

The FT control chip 14 in the redundant server 10 of the first system and the FT control chip 24 in the redundant server 20 of the second system issue SyncReset release commands of the main unit BIOS. It should be noted that the FT control chip 14 and the FT control chip 24 may be adapted such that if one of the FT control chip 14 and the FT control chip 24 issues a SyncReset release command of the main unit BIOS, the chip notifies/transfers the SyncReset release command to the other via the crosslink.

Next, in the redundant server 10 of the first system, the FT control chip 14 shifts the mode of each of the memories 12 (12-$b$, b=1~y) to an active mode via the chip set 13 and the CPUs 11 (11-$a$, a=1~x). Similarly, in the redundant server 20 of the second system, the FT control chip 24 shifts the mode of each of the memories 12 (12-$b$, b=1~y) to an active mode via the chip set 23 and the CPUs 21 (21-$a$, a=1~x).

Next, in the redundant server 10 of the first system, the FT control chip 14 transmits a SyncReset release signal as the signal 141 to the chip set 13 and the CPUs 11 (11-$a$, a=1~x), to negate SyncReset. This means that with respect to the chip set 13 and the CPUs 11 (11-$a$, a=1~x), SyncReset becomes inactive (invalid/logically fault). Similarly, in the redundant server 20 of the second system, the FT control chip 24 transmits a SyncReset release signal as the signal 241 to the chip set 23 and the CPUs 21 (21-$a$, a=1~x) to negate SyncReset. As an example of a SyncReset release signal, a signal in which the bits of the SyncReset are reversed may be considered. It should be noted that the FT control chip 14 and the FT control chip 22 may be adapted such that if one of the FT control chip 14 and the FT control chip 22 transmits a SyncReset release signal, the chip notifies/transfers the SyncReset release signal to the other via the crosslink.

[Operation when a Failure Occurs]

Next, an operation of the fault tolerant system shown in FIG. 1 will be described with reference to the flowchart of FIG. 2.

Here, an operation will be described using, as an example, the case where a failure occurs in a memory 22-5 in the redundant server 20 of the second system when a memory 12-6 in the redundant server 10 of the first system and a memory 22-6 in the redundant server 20 of the second system are operated in an unused state on the OS (Operating System) as standby memories.

(1) Step S1

The FT control chip 14 in the redundant server 10 of the first system and the FT control chip 24 in the redundant server 20 of the second system detect whether or not a failure occurs in devices such as CPUs and memories in the duplexed operation. If there is no failure (No at step S1), the FT control chip 14 in the redundant server 10 of the first system and the FT control chip 24 in the redundant server 20 of the second system continue monitoring.

(2) Step S2

If detecting that a failure has occurred (Yes at step S1), the FT control chip 14 in the redundant server 10 of the first system and the FT control chip 24 in the redundant server 20 of the second system separate the system in which the failure has occurred. In this example, a failure has occurred in the memory 22-5 in the redundant server 20 of the second system. As such, the FT control chip 14 in the redundant server 10 of the first system, which operates normally, separates the redundant server 20 of the second system in which the failure has occurred.

(3) Step S3

The FT control chip 14 of the redundant server 10 of the first system, which operates normally, recognizes the failure of the memory 22-5 in the redundant server 20 of the second system, in which the failure has occurred, by the software control using the crosslink.

(4) Step S4

The FT control chip 14 in the redundant server 10 of the first system generates a system management interrupt (SMI) signal as the signal 141 by the software (SW) control to suspend the operation of the OS running on the CPUs 11 (11-$a$, $a=1\sim x$).

(5) Step S5

The FT control chip 14 in the redundant server 10 of the first system saves the context data of the CPUs 11 (11-$a$, $a=1\sim x$) to a storing region provided inside the FT control chip 14 by the SW control. In practice, however, the destination of saving the context data is not limited to the above-mentioned storing region. Examples of the context data may include setting information of hardware (HW) such as CPUs, registers, and memories (hardware configuration information), CPU state information (values of program counter, etc.), various kinds of information required for executing a program/process/task, and the like.

(6) Step S6

Further, the FT control chip 14 in the redundant server 10 of the first system copies the data in a duplexed memory, corresponding to the memory in which the failure has occurred, to another memory (standby memory) by the SW control. In this example, the FT control chip 14 copies the data in the memory 12-5, which is a duplexed memory corresponding to the memory 22-5 in which the failure has occurred, to the memory 12-6. Thereby, the FT control chip 14 makes the system to be in a state where the memory 12-5 can be separated.

(7) Step S7

Further, the FT control chip 14 in the redundant server 10 of the first system changes the hardware configuration information in the saved context data to have a configuration of using the memory 12-6 instead of the memory 12-5, by the SW control.

(8) Step S8

Further, the FT control chip 14 in the redundant server 10 of the first system copies the entire information of the redundant server 10 of the first system operating normally to the redundant server 20 of the second system in which the failure has occurred, using the crosslink by the SW control. Specifically, the control chip 14 copies the context data after the change to a storing region provided inside the control chip 24 via the crosslink. Further, the FT control chip 14 copies the data stored in all of the memories to be used (except for the memory 12-5) to the corresponding memories (except for the memory 22-5) in the redundant server 20 of the second system, via the crosslink.

(9) Step S9

Then, the FT control chip 14 in the redundant server 10 of the first system and the FT control chip 24 in the redundant server 20 of the second system issue SyncReset commands of the main unit BIOS. This means that the "SyncReset operation", described above, is performed. Thereby, the CPU 11 in the redundant server 10 of the first system and the CPU 21 in the redundant server 20 of the second system start initialization processing by the SyncReset.

(10) Step S10

In the initialization processing by the SyncReset, the FT control chip 14 in the redundant server 10 of the first system and the FT control chip 24 in the redundant server 20 of the second system allow the CPU 11 in the redundant server 10 of the first system and the CPU 21 in the redundant server 20 of the second system to read the context data stored in the storing regions inside.

(11) Step S11 When the context data is restored by being read, the CPU 11 in the redundant server 10 of the first system and the CPU 21 in the redundant server 20 of the second system restore the state shown by the context data, and in a state where the failed memories are separated, return to the processing from the system management interruption (SMI) to resume the operation of the OS having been stopped. It should be noted that a state where the failed memories are separated means that the memory 22-5 in which the failure has occurred and the memory 12-5 corresponding thereto are unused.

<Examples of Hardware>

Hereinafter, examples of specific hardware for realizing the fault tolerant system according to the present invention will be described.

As examples of the redundant server 10 of the first system and the redundant server 20 of the second system, computers such as PCs (personal computers), appliances, thin client servers, workstations, mainframes, and supercomputers are assumed. Besides computers, relay devices, peripheral devices, and other electronic devices may be used in practice.

Further, as an example of the fault tolerant system according to the present invention, a rack mount server may be considered. In that case, as examples of the redundant server 10 of the first system and the redundant server 20 of the second system, hardware of rack mount type (PCs, RAID storages, specialized firewall machines, and the like) may be considered.

Further, the redundant server 10 of the first system and the redundant server 20 of the second system may be an extension board installed in a computer or the like, or a virtual machine (VM) configured on a physical machine.

It should be noted that the CPU 11 and the CPU 21 are mere examples of processors. As examples of processors, network processors (NP), microprocessors, microcontrollers, and large scale integrations (LSI) having dedicated functions may be considered, besides CPUs. Further, the CPU 11 and CPU 21 may be electronic circuits having processors as described above.

Further, the memory 12 and the memory 22 are mere examples of memories. As examples of memories, semiconductor memories such as RAM (Random Access Memory), ROM (Read Only Memory), EEPROM (Electrically Erasable and Programmable Read Only Memory), and flash memories may be considered. Most of the memories used in the current market are DRAM (Dynamic Random Access Memory). DRAM can be classified into "SDRAM" (Synchronous DRAM), "DDR SDRAM" (Double Data Rate SDRAM), "DDR2 SDRAM" (Double Data Rate 2 SDRAM), "DDR3 SDRAM (Double Data Rate 3 SDRAM), and the like, depending on the difference in driving method. Further, buffers, registers, and the like may also be used.

It should be noted that the processor and the memory may be integrated. For example, a one-chip microcomputer or the like is increasingly used in recent years. For example, there is a "CPU module equipped with a CPU, a memory, a north bridge, and a BIOS", and the like. As such, a case where a one-chip microcomputer installed in an electronic device or the like includes the processor and the memory can also be considered.

Further, as examples of interfaces used for the crosslink between the FT control chip 14 and the FT control chip 24, besides link ports connected with link lines, semiconductor integrated circuits such as circuit boards (motherboard, I/O board) supporting network communications, network adapters such as NIC (Network Interface Cards) and similar extension cards, communication devices such as antennas, communication ports such as connectors, and the like may be considered.

Further, as examples of link lines, data buses, serial communication lines, Internet, LAN (Local Area Network), wireless LAN, WAN (Wide Area Network), backbones, CATV (Cable Television) lines, fixed telephone networks, mobile telephone networks, WiMAX (IEEE 802.16a), 3G ($3^{rd}$ Generation), lease lines, IrDA (Infrared Data Association), Bluetooth (registered trademark), and the like may be considered.

As an example of the IO controller 15 and the IO controller 25, a module in which a processor and firmware are built is assumed. Further, the IO controller 15 and the IO controller 25 may be a chip having a function of south bridge, or may be an independent device (computer, etc.).

However, they are not limited to these examples in practice.

Overview of Present Embodiment

The present embodiment is configured such that in fault tolerant servers which operate in lockstep in two systems, when a failure occurs, while one system in which the failure has occurred is separated to maintain the operation generally (basically), in accordance with a selected user policy, only the failed part is fallen back and the systems return to a duplexed operation.

To be specific, in fault tolerant servers, when a failure occurs in a CPU or a memory, the system in which the failure has occurred is once separated.

The system, operating normally, specifies the failed device in the system in which the failure has occurred, using the communication path between the systems.

Then, the OS operation is temporarily stopped, and the context data (HW setting information of the register or the like) of the CPU is saved.

Then, the data used by the duplexed device corresponding to the specified failed device, among the devices of the system which operates normally, is copied to another device, whereby a separable state is realized.

Then, the saved context data is changed to have configuration information not using the failed device.

Then, the entire information of the system operating normally is copied to the system in which the failure has occurred, with use of the communication path between the systems.

Then, the CPUs of the both systems are reset simultaneously/at the same time, without resetting the data in the memories of the both systems.

The CPUs of the both systems start initialization simultaneously, read the saved context data, and restore the information.

Thereby, the OS operation is restored with the configuration not using the failed device. As such, it is possible to operate the system by separating the part in which the failure has occurred (failed device) while maintaining the synchronous state.

In the present embodiment, as the duplexed operation is restored by only falling back the failed part, it is possible to continue operation even if another failure occurs in another part.

While the exemplary embodiment of the present invention has been described in detail, the present invention is not limited to the above-described embodiment. Various changes can be made therein without departing from the scope of the present invention.

[Supplementary Notes]

The whole or part of the exemplary embodiment disclosed above can be described as, but not limited to, the following supplementary notes.

(Supplementary Note 1)

A non-transitory computer-readable medium storing a program comprising instructions for causing a redundant server of a first system in a redundant system to perform, the redundant system including the redundant server of the first system and a redundant server of a second system:

in a state where the redundant server of the first system and the redundant server of the second system operate in lockstep, when a failure occurs in the redundant server of the second system, control to separate the redundant server of the second system in which the failure has occurred, and continue an operation;

control to prepare for restoration to a duplexed operation with a configuration in which a failed part is fallen back; and control to start a lockstep operation from initialization processing by synchronous reset with the redundant server of the second system, and resume the duplexed operation with the configuration in which the failed part is fallen back.

(Supplementary Note 2)

The program according to supplementary note 1, wherein the redundant server of the first system includes a first CPU, a plurality of first memories, and a first fault tolerant control section, and the redundant server of the second system includes a second CPU, a plurality of second memories, and a second fault tolerant control section, if the failed part is any one of the second memories in the redundant server of the second system, in the control to prepare for restoration to the duplexed operation, the redundant server of the first system performs control to stop an operation of an OS running on the first CPU, control to save context data including hardware configuration information of the own system and information of a state of the first CPU into the first fault tolerant control section, control to copy data stored in one of the first memories corresponding to the failed one of the second memories to any one of unused memories of the first memories, control to change the hardware configuration information in the saved context data so as not to use the one of the first memories of the own system corresponding to the failed one of the second memories, and control to copy the context data after the change and data stored in the first memories to the second fault tolerant control section and the second memories in the redundant server of the second system.

(Supplementary Note 3)

The program according to supplementary note 2, wherein in the control to resume the duplexed operation, the redundant server of the first system performs control to implement the initialization processing by the synchronous reset by the redundant server of the first system and the redundant server of the second system, and control to resume the operation of the OS by the first CPU and the second CPU.

(Supplementary Note 4)

The program according to supplementary note 3, wherein in the control to implement the initialization processing by the synchronous reset, the redundant server of the first system controls processing to read the context data stored in the first fault tolerant control section and the context data stored in the second fault tolerant control section into the first CPU and the second CPU.

(Supplementary Note 5)

The program according to supplementary note 4, wherein in the control to implement the initialization processing by the synchronous reset, the redundant server of the first system does not reset the data in the first memories and the data in the second memories.

The invention claimed is:

1. A control method for a redundant system including a redundant server of a first system and a redundant server of a second system, the redundant server of the first system and the redundant server of the second system operating in lockstep, the method comprising:
   when a failure occurs in the redundant server of the second system, by the redundant server of the first system, separating the redundant server of the second system in which the failure has occurred and continuing an operation;
   by the redundant server of the first system, preparing for restoration to a duplexed operation with a configuration in which a failed part is fallen back; and
   by both the redundant server of the first system and the redundant server of the second system, starting a lockstep operation from initialization processing by synchronous reset, and resuming the duplexed operation with the configuration in which the failed part is fallen back, wherein
   the redundant server of the first system includes a first CPU, a plurality of first memories, and a first fault tolerant control section, and the redundant server of the second system includes a second CPU, a plurality of second memories, and a second fault tolerant control section,
   if the failed part is any one of the second memories in the redundant server of the second system, the preparing for restoration to the duplexed operation includes, by the redundant server of the first system, stopping an operation of an OS running on the first CPU, saving context data including hardware configuration information of the own system and information of a state of the first CPU into the first fault tolerant control section, copying data stored in one of the first memories corresponding to the failed one of the second memories to any one of unused memories of the first memories, changing the hardware configuration information in the saved context data so as not to use the one of the first memories of the own system corresponding the failed one of the second memories, and copying the context data after the change and data stored in the first memories to the second fault tolerant control section and the second memories in the redundant server of the second system.

2. The control method for the redundant system, according to claim 1, wherein
   the resuming the duplexed operation includes, by the redundant server of the first system and the redundant server of the second system, resuming the operation of the OS by the first CPU and the second CPU after implementing the initialization processing by the synchronous reset.

3. The control method for the redundant system, according to claim 2, wherein
   in the initialization processing by the synchronous reset, the redundant server of the first system and the redundant server of the second system perform processing to read the context data stored in the first fault tolerant control section and the context data stored in the second fault tolerant control section into the first CPU and the second CPU.

4. The control method for the redundant system, according to claim 3, wherein
   in the initialization processing by the synchronous reset, the redundant server of the first system and the redundant server of the second system do not reset the data in the first memories and the data in the second memories.

5. A redundant system comprising
   a redundant server of a first system and a redundant server of a second system, wherein
   the redundant server of the first system and the redundant server of the second system operate in lockstep,
   when a failure occurs in the redundant server of the second system, after the redundant server of the first system separates the redundant server of the second system in which the failure has occurred and continues an operation, the redundant server of the first system prepares for restoration to a duplexed operation with a configuration in which a failed part is fallen back, and both the redundant server of the first system and the redundant server of the second system start a lockstep operation from initialization processing by synchronous reset when preparation is completed, and resume the duplexed operation with the configuration in which the failed part is fallen back, wherein
   the redundant server of the first system includes a first CPU, a plurality of first memories, and a first fault tolerant control section, and the redundant server of the second system includes a second CPU a plurality of second memories, and a second fault tolerant control section,
   if the failed part is any one of the second memories in the redundant server of the second system, in the preparation for restoration to the duplexed operation, the redundant server of the first system stops an operation of an OS running on the first CPU, saves context data including hardware configuration information of the own system and information of a state of the first CPU into the first fault tolerant control section, copies data stored in one of the first memories corresponding to the failed one the second memories to an one of unused memories of the first memories, changes the hardware configuration information in the saved context data so as not to use the one of the first memories of the own system corresponding to the failed one of the second memories, and copies the context data after the change and data stored in the first memories to the second fault tolerant control section and the second memories in the redundant server of the second system.

6. The redundant system, according to claim 5, wherein
   when resuming the duplexed operation, the redundant server of the first system and the redundant server of the second system resume the operation of the OS by the first CPU and the second CPU after implementing the initialization processing by the synchronous reset.

7. The redundant system, according to claim 6, wherein
   in the initialization processing by the synchronous reset, the redundant server of the first system and the redundant server of the second system perform processing to read the context data stored in the first fault tolerant control section and the context data stored in the second fault tolerant control section into the first CPU and the second CPU.

8. The redundant system, according to claim 7, wherein
   in the initialization processing by the synchronous reset, the redundant server of the first system and the redundant server of the second system do not reset the data in the first memories and the data in the second memories.

9. A redundant server of a first system in a redundant system, the redundant system including the redundant server of the first system and a redundant server of a second system, the redundant server of the first system comprising a first fault tolerant control section, wherein in a state where the redundant server of the first system and the redundant server of the second system operate in lockstep, when a failure occurs in the redundant server of the second system, the first fault tolerant control section performs control to separate the redundant server of the second system in which the failure has occurred and continue an operation, control to prepare for restoration to a duplexed operation with a configuration in which a failed part is fallen back, and control to start a lockstep operation from initialization processing by synchronous reset with the redundant server of the second system and resume the duplexed operation with the configuration in which the failed part is fallen back, wherein the redundant server of the first system includes a first CPU, a plurality of first memories, and the first fault tolerant control section, and the redundant server of the second system includes a second CPU, a plurality of second memories, and a second fault tolerant control section, if the failed part is any one of the second memories in the redundant server of the second system, in the control to prepare for restoration to the duplexed operation, the first fault tolerant control section performs control to stop an operation of an OS running on the first CPU, control to save context data including hardware configuration information of the own system and information of a state of the first CPU into the own fault tolerant control section, control to copy data stored in one of the first memories corresponding to the failed one of the second memories to any one of unused memories of the first memories, control to change the hardware configuration information in the saved context data so as not to use the one of the first memories of the own system corresponding to the failed one of the second memories, and control to copy the context data after the change and data stored in the first memories to the second fault tolerant control section and the second memories in the redundant server of the second system.

10. The redundant server, according to claim 9, wherein in the control to resume the duplexed operation, the first fault tolerant control section performs control to implement the initialization processing by the synchronous reset by the redundant server of the first system and the redundant server of the second system, and control to resume the operation of the OS by the first CPU and the second CPU.

11. The redundant server, according to claim 10, wherein in the control to implement the initialization processing by the synchronous reset, the first fault tolerant control section controls processing to read the context data stored in the first fault tolerant control section and the context data stored in the second fault tolerant control section into the first CPU and the second CPU.

12. The redundant server, according to claim 11, wherein in the control to implement the initialization processing by the synchronous reset, the first fault tolerant control section does not reset the data in the first memories and the data in the second memories.

\* \* \* \* \*